United States Patent [19]

Fuji et al.

[11] Patent Number: 4,785,252

[45] Date of Patent: Nov. 15, 1988

[54] WAVEFORM PROCESSING CIRCUIT

[75] Inventors: Hiroshi Fuji; Takashi Iwaki; Tsuneo Fujiwara, all of Tenri; Toshihisa Deguchi; Shozou Kobayashi, both of Nara, all of Japan

[73] Assignee: Sharp Kabushiki Kaisha, Osaka, Japan

[21] Appl. No.: 916,644

[22] Filed: Oct. 8, 1986

[30] Foreign Application Priority Data

Oct. 8, 1985 [JP] Japan .............................. 60-224599
Oct. 8, 1985 [JP] Japan .............................. 60-224600

[51] Int. Cl.$^4$ ........................... H03K 5/00; H03B 1/00
[52] U.S. Cl. ..................................... 328/151; 328/167; 307/353; 307/358; 360/48
[58] Field of Search ............... 328/150, 152, 154, 151, 328/167; 307/352, 353, 358; 360/48

[56] References Cited

U.S. PATENT DOCUMENTS

| 3,660,821 | 5/1972 | Weber et al. | 360/48 |
| 4,373,141 | 2/1983 | Sanders | 328/151 |
| 4,433,255 | 2/1984 | Taguchi et al. | 328/152 |

FOREIGN PATENT DOCUMENTS 0124312 9/1981 Japan ................... 307/353

Primary Examiner—Stanley D. Miller
Assistant Examiner—Tai Van Duong
Attorney, Agent, or Firm—Birch, Stewart, Kolasch & Birch

[57] ABSTRACT

A waveform processing circuit includes a switching circuit having first and second inputs and one output. The first input receives head portions and data portions contained in a reproduced signal from an optical head. The second input receives a level signal representing the level of the head portion or the level of the signal carrying the head portion. The switching circuit is switches between a first state in which the first input and the output are connected, and a second state in which the second input and the output are connected. A control signal producer produces a first control pulse indicating the presence of the data portion. The first control pulse is applied to the switching circuit for actuating the switching circuit to establish the first state when the first control pulse is present, and to establish the second state when the first control pulse is not present, so that the switching circuit continuously produces the signal having a level within the range of the head portion. Thus, no abrupt change caused by transient phenomena will be observed in a high pass filter connected to the switching circuit.

14 Claims, 6 Drawing Sheets

WAVEFORM PROCESSING CIRCUIT

BACKGROUND OF THE INVENTION

1. Field of the Invention

The present invention relates to a waveform processing circuit for use, for example, in a reproducing circuit of a photomagnetic disc system.

2. Description of the Prior Art

The waveform processing circuit will be described in connection with a reproducing circuit of a photomagnetic disc system, as an example.

A photomagnetic disc recording and reproducing system has a laser beam generator for generating a converged laser beam having a diameter of about 1 micrometer on a disc. The disc has a laminated film which shows a photomagnetic effect.

In the recording mode, a relatively strong pulsating laser beam (high level beam) carrying information is impinged on the disc to increase the temperature of the impinged spot on the film. The spot on the film where the temperature is increased frees the coercive force so that the spot is magnetized in a certain direction dependent upon a magnetic field produced around the disc by a magnetic field generator, thereby recording the information.

In the reproducing mode, a relatively weak and constant linearly-polarized laser beam (low level beam) is impinged on the disc and the reflected beam is detected by a detector. By the Kerr magnetooptical effect on the film, the reflected beam shows the inclination of the polarization face due to the change of magnetized direction of the film. When the inclination is viewed through an analyzer, a pulsating signal representing the change of the inclination can be detected by a light detector. The pulsating signal produced from the light detector will be the reproduced signal.

Generally, a recording of information on the photomagnetic disc is effected on a track aligned with a plurality of sectors (FIG. 2), each sector including a head portion where the address data and other similar data are stored with a high frequency signal in a predetermined format, and a data portion, following the head portion, which is utilized for recording and reproducing the desired data at a high frequency. During the recording mode, the head portion is impinged with a low level beam to read out (reproduce) the address data and other data stored therein thereby locating the sector on the disc. Then, the data portion following the detected head portion is impinged with the high level beam carrying information to record data therein. During the reproducing mode, the head portion is reproduced by the low level beam in the same manner to locate the sector being impinged with the beam, and then, the data portion following the head portion is impinged with the low level beam to reproduce the recorded data. Accordingly, even in the recording mode, the reproducing operation is carried out for reading the address data in the head portion.

The reproduced signal Sa from the light detector, such as shown in FIG. 2, contains a high frequency component signal (VD-VL) or (VP-VL) carrying wanted data and a low frequency component signal VL caused by the conversion between the optical signal and the electric signal. The head portion contains a high frequency signal (VD-VL). The data portion contains, in the recording mode, a high frequency signal (VP-VL), and in the reproducing mode, a high frequency signal (VD-VL). The signal (VP-VL) is greater than the signal (VD-VL). In order to remove the low frequency component VL, a high pass filter such as defined by a coupling capacitor Ca and a resistor Ra as shown in FIG. 1 is used. The reproduced signal as obtained from the light detector is a current signal, which is converted to a voltage signal by a suitable current-voltage converter. The reproduced signal Sa in the voltage form as produced from the current-voltage converter is applied to the high pass filter, and the filter produces a filtered signal Sb which is also shown in FIG. 2.

When the input signal Sa is the recording mode is applied to the high pass filter, the high pass filter produces an output signal Sb such that the low frequency signal VL is cut off, and the high frequency signal (VD-VL) passes therethrough. However, due to the transient phenomena of the high voltage signal VP, the output signal Vo will be deformed greatly. More specifically, as shown in FIG. 2, the output signal Sb gradually decreases after the receipt of the leading edge of the high voltage signal VP and gradually increases after the receipt of the trailing edge of the high voltage signal VP. In this case, since the head portion, as included in the gradual increasing line, may be located outside the dynamic range, the head portion may not be properly read in the subsequent stage by the signal detector. Although it is possible to widen the dynamic range to include the head portion therein, the signal becomes poor particularly when a signal is detected at the comparator.

SUMMARY OF THE INVENTION

The present invention has been developed with a view to substantially solving the above described disadvantage and has for its essential object to provide an improved waveform processing circuit by which the high voltage signal VP can be eliminated without deforming the output signal of the high pass filter.

It is also an essential object of the present invention to provide a waveform processing circuit which is ready to be used in a a photomagnetic disc system.

In accomplishing these and other objects, a waveform processing circuit according to one preferred embodiment comprises a switching circuit having first and second inputs and one output. The first input is adapted to receive the head portions and the data portions contained in the reproduced signal from the optical head. The second input receives a level signal representing the level of the head portion or the level of the signal carrying the head portion. The switching circuit is operable to move between a first state in which the first input and the output are connected, and a second state in which the second input and the output are connected. A control signal producer is provided for producing a first control pulse indicating the presence of the data portion. The first control pulse is applied to the switching circuit for actuating the switching circuit to establish the first state when the first control pulse is present, and to establish the second state when the first control pulse is not present, so that the switching circuit continuously produces the signal having a level within the range of the head portion. Thus, no abrupt change caused by the transient phenomena will be observed in the high pass filter connected to the switching circuit.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Figure 1:
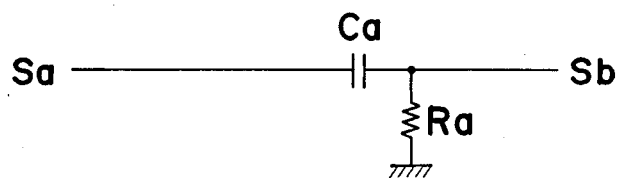
FIG. 1 is a circuit diagram of a prior art high pass filter.
Figure 2:
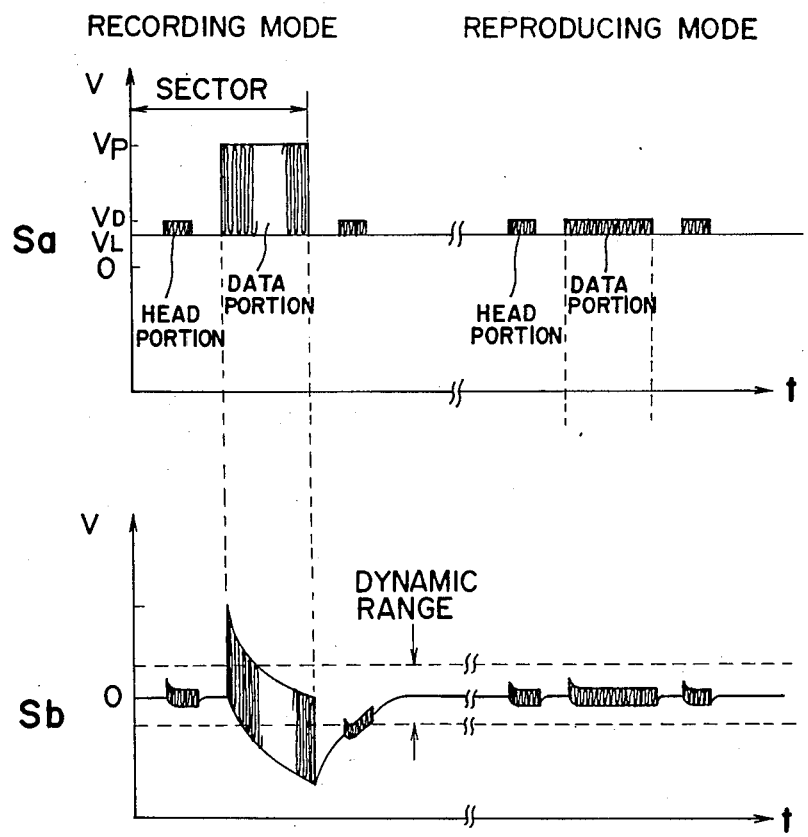
FIG. 2 is a graph showing waveforms of the reproduced signal before and after the reproduced signal is applied to the high pass filter of FIG. 1.
Figure 3:
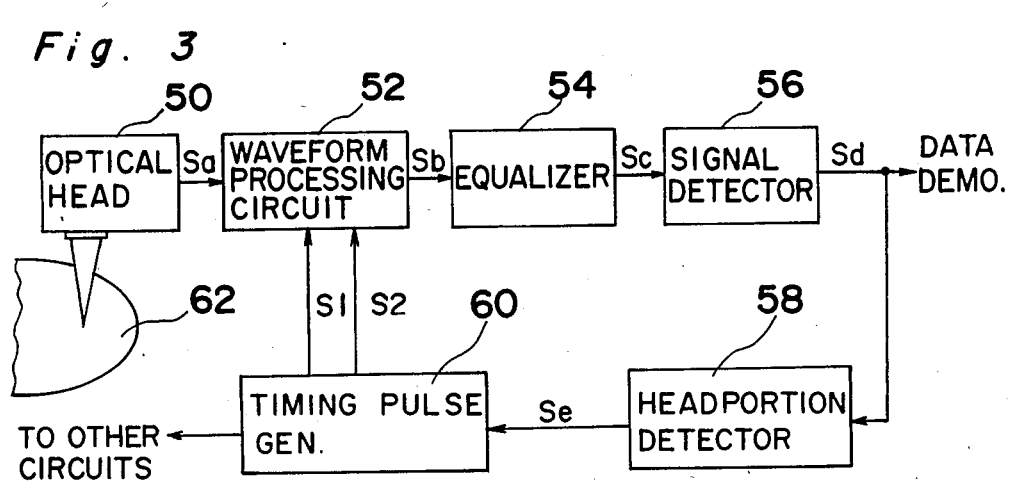
FIG. 3 is a block diagram of a photomagnetic disc system according to the present invention.
Figure 4:
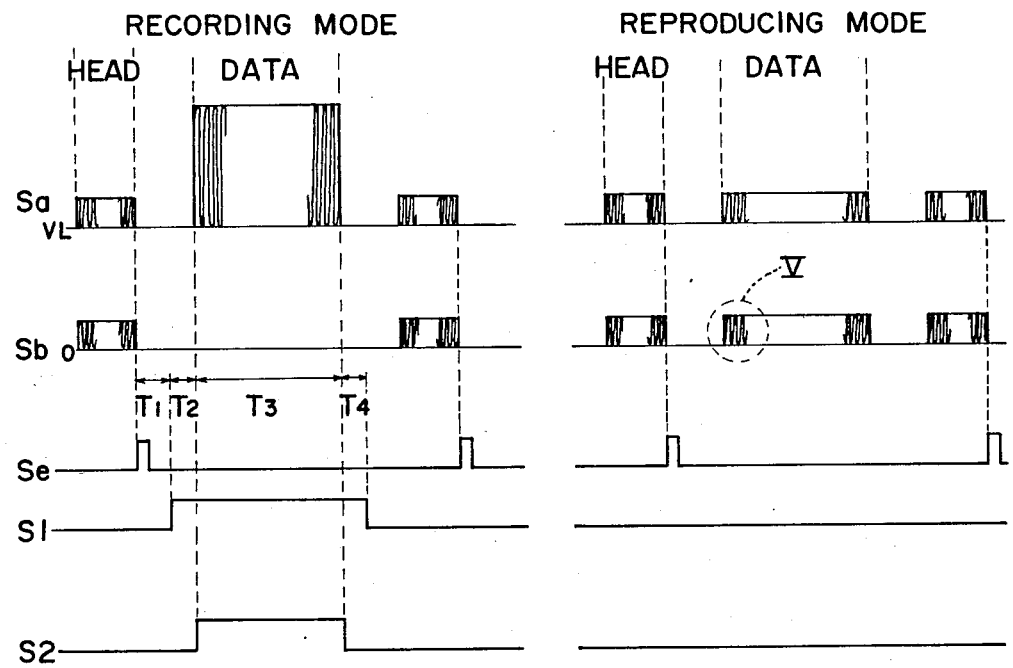
FIG. 4 is a graph showing waveforms obtained at various blocks shown in FIG. 3.

Referring to FIG. 3, a photomagnetic disc system is shown which a comprises an optical head 50 from which laser beam is produced onto a disc 62, a waveform processing circuit 52, equalizer 54 and signal detector 56 which are connected in series. Signal detector 56 is connected to a head portion detector 58 which is in turn connected to a timing pulse generator 60. Timing pulses S1 and S2 produced from the timing pulse generator 60 are used in the waveform processing circuit 52. The signals produced from these circuits are described below with reference to FIGS. 4 and 5.

Optical head 50 produces a reproduced voltage signal Sa containing high frequency head portions and high frequency data portions appearing alternately and separated with by suitable intervals. The head portions and the data portions are carried on a low frequency signal VL. During the recording mode, the data portions have a relatively high amplitude, and during the reproducing mode, the data portions have a relatively low amplitude, which is the same as that of the head portions.

Waveform processing circuit 52 receives the signal Sa and produces a signal Sb which is different according to whether the system is in the recording mode or the reproducing mode. In the recording mode, the signal Sb contains only the head portions, and in the reproducing mode, Sb contains both the head portions and the data portions. In the waveform processing circuit 52, the low frequency signal VL is cut off, so that the head and data portions are now carried on a zero level. According to the present invention no deformation of the output signal Sb is observed which would otherwise cause the head portion to be swung out from a predetermined range. The detail of the waveform processing circuit 52 will be described later in connection with FIGS. 6-9.

Figure 10:
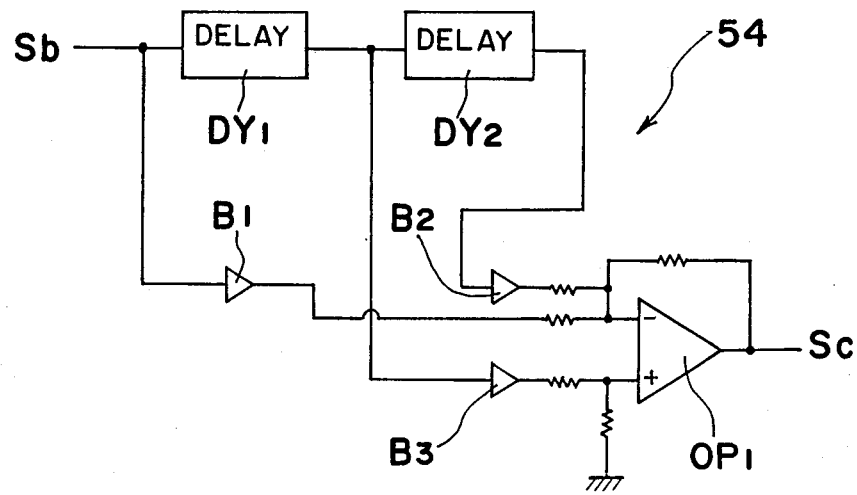
FIG. 10 is a circuit diagram of an equalizer.

Equalizer 54 is provided to compensate for an undesired phase frequency response, and produces a signal Sc (FIG. 5) which is substantially the same as the signal Sb, but the waves are more standardized and the slopes are made more steep. An example of equalizer 54, defined by a transversal filter, is shown in FIG. 10 which comprises first and second delay circuits DY1 and DY2, buffer amplifiers B1, B2 and B3 and operational amplifier OP1. Other examples of the equalizer are disclosed, for example, in Japanese Patent Laid-Open Publication No. 60-107736 published June 13, 1985.

Figure 5:
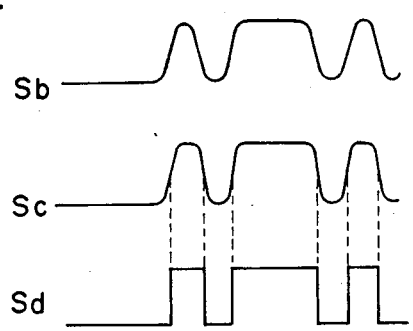
FIG. 5 is a graph showing a detail of a portion V shown in FIG. 4.

Signal detector 56 changes the sinusoidal high frequency wave signal contained in the head portion and data portion to a rectangular pulse signal in a binary form. Thus, signal detector 56 produces signal Sd, as shown in FIG. 5, which is provided to a data demodulator (not shown) and also to head portion detector 58. The detail of signal detector 56 will be described later in connection with FIGS. 11-14.

Head portion detector 58 is provided to produce a reference pulse (signal Se) upon detection of the head portion.

Figure 9:
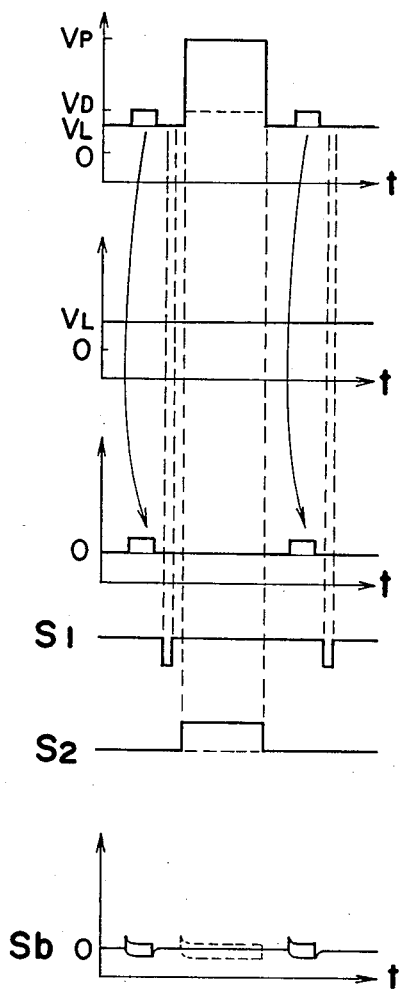
FIG. 9 is a graph showing waveforms obtained at various points in the circuit of FIG. 8.

Timing pulse generator 60, according to the first embodiment, generates control pulses S1 and S2 in the recording mode and no control pulse in the reproducing mode. Timing pulse generator 60 includes a counter or a delay circuit for counting times T1, T2, T3 and T4, shown in FIG. 4, after the reference pulse Se is generated so as to prepare control pulses S1 and S2. As apparent from FIG. 4, the control pulse S1 has a pulse duration a little greater than the duration of the data portion so as to include the data portion while the control pulse S1 is generated. The control pulse S2 has a pulse duration the same as the duration of the data portion and is synchronized with the data portion. The control pulses S1 and S2 are used in the waveform processing circuit 52 for extracting the data portion during the recording mode. The control pulses generated in the second embodiment, such as shown in FIG. 9, are different from those of the first embodiment, but are generated in a similar manner described above; and are used for the same purpose. The timing pulse generator 60 further produces other pulses to control other circuits (not shown).

Figure 6:
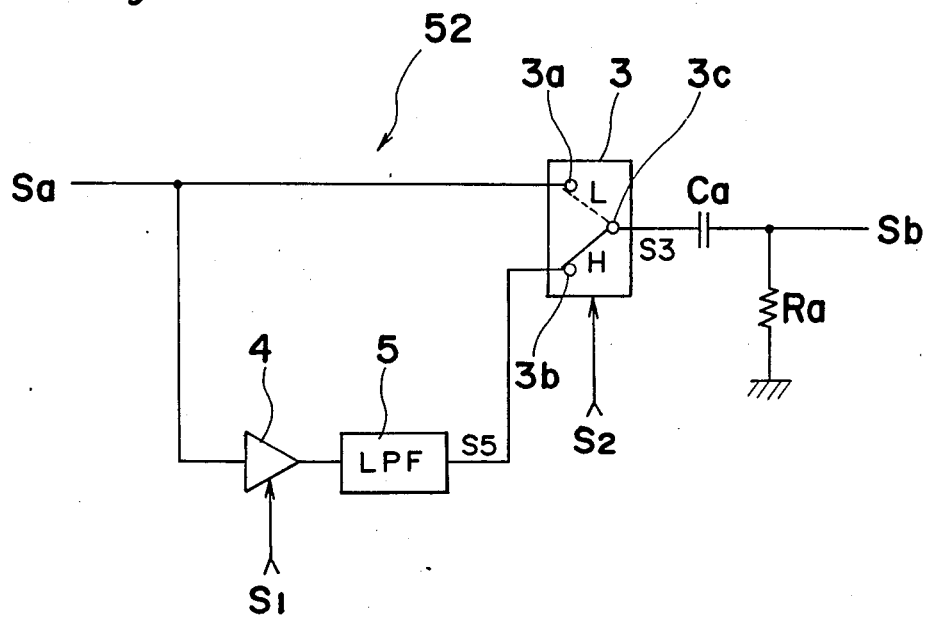
FIG. 6 is a circuit diagram of a waveform processing circuit according to a first embodiment of the present invention.

Referring to FIG. 6, a first embodiment of the waveform processing circuit 52 is shown, which comprises a switching circuit having terminals 3a, 3b and 3c. Terminal 3a is connected to the optical head 50 so as to receive the signal Sa directly. Terminal 3b is connected to the optical head 50 through a series connection of a sample holding circuit 4 and a low pass filter 5. Terminal 3c is connected to a high pass filter defined by capacitor Ca and resistor Ra. The output Sb of the high pass filter is produced as the output of the waveform processing circuit 52.

Sample holding circuit 4 is controlled by control pulse S1 so as to sample the signal Sa in response to the leading edge of the control pulse S1 and holds the sampled signal while the control pulse S1 is present. When the control pulse S1 is not present, the signal Sa applied to the input of sample holding circuit 4 is transmitted directly to the low pass filter 5.

Switching circuit 3 is controlled by control pulse S2 such that the terminal 3c is connected to terminal 3b as shown by a real line when the control pulse S2 takes a HIGH level and it is connected to terminal 3a as shown by a dotted line when the control pulse S2 takes a LOW level.

The operation of the waveform processing circuit 52 will be described below.

In the recording mode, control pulses S1 and S2 are produced. When the header portion of the input signal Sa carried on the low frequency level VL is applied, control pulse S1 or S2 is not present. Thus, the switching circuit 3 is in the position shown by a dotted line. Thus, the head portion is transmitted through terminals 3a and 3c and through the high pass filter thereby cutting off the low frequency level VL. During this period, the head portion is also transmitted through the sample holding circuit 4 and low pass filter 5 but, it will not be transmitted through the switching circuit 3.

Then, in response to the step up of the control pulse S1, the voltage level of signal Sa, which is the low frequency level VL, is sampled and held in the circuit 4.

Immediately thereafter, in response to the step up of the control pulse S2, the switching circuit 3 changes its position to that shown by a real line. Thus, the sampled low frequency level VL as produced from low pass filter 5 is transmitted through terminals 3b and 3c and through the high pass filter to cut off the low frequency level VL. During this period, the data portion having a high amplitude is applied to terminal 3a, but it is not transmitted through the switching circuit 3.

Then, when the control pulse S2 ends at the time when the data portion ends, the switching circuit 3 returns back to the position indicated by a dotted line. Thus, the input signal Sa is again directly transmitted through the switching circuit 3. Immediately thereafter, in response to the step down of the control pulse S1, the sample hold circuit 4 releases the sampled signal and permits the signal to pass therethrough. The sampling is effected after each head portion so that the low frequency level VL as sampled by circuit 4 can be renewed after every head portion.

Figure 7:
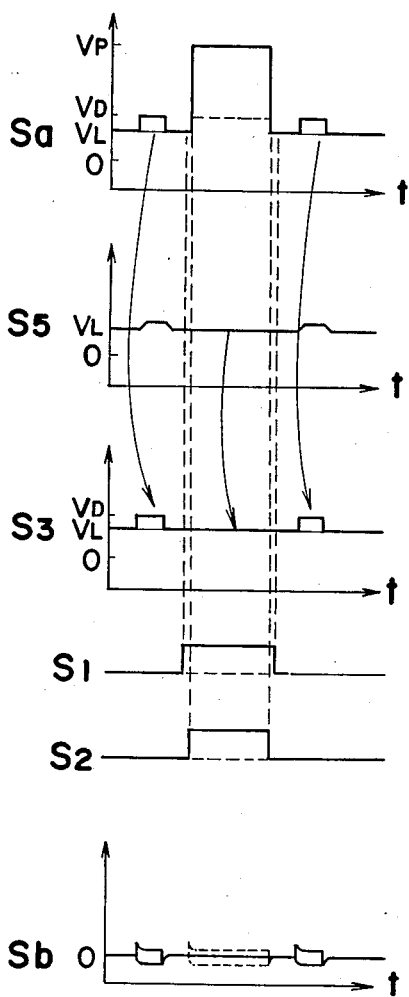
FIG. 7 is a graph showing waveforms obtained at various points in the circuit of FIG. 6.

As apparent from the above, during the recording mode, waveform processing circuit 52 according to the first embodiment produces a signal Sb as shown by a real line in FIG. 7.

On the other hand, during the reproducing mode, since control pulses S1 and S2 are not produced, as indicated by dotted lined in FIG. 7, the switching circuit 3 is always held in the position so as to connect terminals 3a and 3c as indicated by the dotted line. Therefore, the head portions and the data portions having a low amplitude are transmitted directly to the high pass filter.

Figure 8:
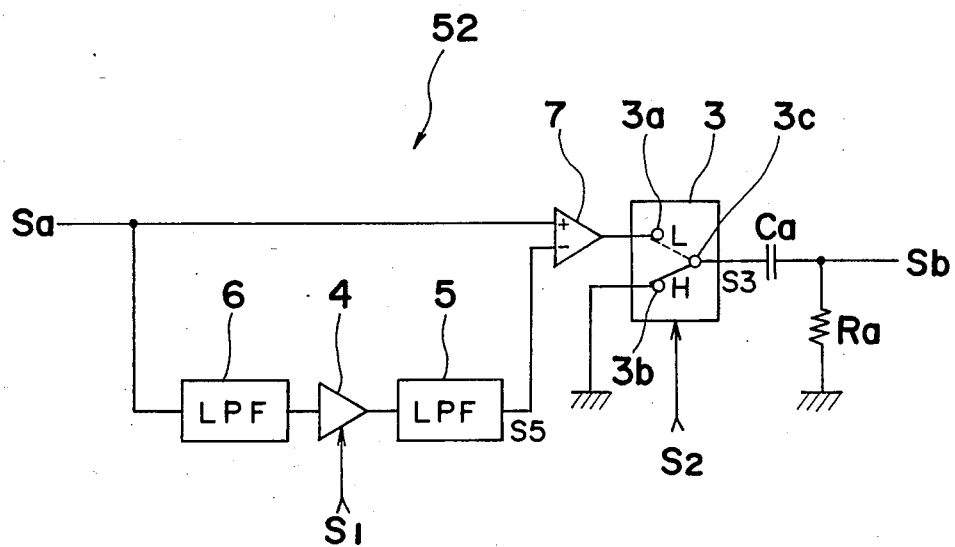
FIG. 8 is a circuit diagram of a waveform processing circuit according to a second embodiment of the present invention.

Referring to FIG. 8, a second embodiment of the waveform processing circuit 52 is shown, which further comprises a differential amplifier 7. A low pass filter 6 is inserted in the input side of the sample and holding circuit 4, but it can be eliminated. The non-inverting input of differential amplifier 7 is connected to receive the input signal Sa directly, and the inverting input thereof is connected to receive the output of low pass filter 5. The output of differential amplifier 7 is connected to terminal 3a. In this embodiment, terminal 3b is connected to ground.

In the second embodiment, control pulses S1 and S2 have a different pattern. As shown in FIG. 9, the control signal S1 is normally at a HIGH level, but it intermittently takes a LOW level in the interval between the trailing edge of the head portion and the leading edge of the data portion. This pattern of control signal S1 is present both in the recording mode and the reproducing mode. The control signal S2 is the same at that generated in the first embodiment.

In operation, in the recording mode, control signals S1 and S2 are produced. When the header portion of the input signal Sa is applied, control signal S1 is HIGH and S2 is LOW. Thus, sample and holding circuit 4 produces the low frequency level VL which has been sampled in the previous cycle of operation. Thus, differential amplifier 7 subtracts the low frequency level VL from the header portion, and produces a header portion carried on the zero level to terminal 3a. At this time, since signal S2 is LOW, the switching circuit 3 is in the position shown by a dotted line. Thus, the head portion is transmitted through terminals 3a and 3c and through the high pass filter.

Then, when the control signal S1 temporarily takes a LOW level, the low frequency level VL stored in the sample and holding circuit 4 is renewed.

Then, in response to the step up of the control pulse S2, the switching circuit 3 changes the position to that shown by a real line. Thus, the zero volt signal from the ground is transmitted through terminals 3b and 3c and through the high pass filter.

Then, when the control pulse S2 ends at the time when the data portion ends, the switching circuit 3 returns back to the position indicated by a dotted line. Thus, the input signal Sa carried on the zero level is again transmitted through the switching circuit 3.

Therefore, during the recording mode, waveform processing circuit 52 according to the second embodiment produces a signal Sb as shown by a real line in FIG. 9.

On the other hand, during the reproducing mode, control signal S1 is present, but control signal S2 is not produced, as indicated by dotted lined in FIG. 9. Thus, the switching circuit 3 is always held in the position so as to connect terminals 3a and 3c as indicated by the dotted line. Therefore, the head portions and the data portions carried on the zero level as produced from differential amplifier 7 are transmitted to the high pass filter.

According to the waveform processing circuit of the present invention, since the high amplitude data portion will not pass through the high pass filter, there will be no great deformation of the filtered signal as caused by the transient phenomena. The waveform processing circuit described herein can be used in systems other than the photomagnetic disc system. Also, the waveform processing circuit is shown so as to eliminate unwanted transient phenomena caused by the high pass filter, but the circuit may be applied to eliminate unwanted transient phenomena caused by a low pass filter.

Figure 11:
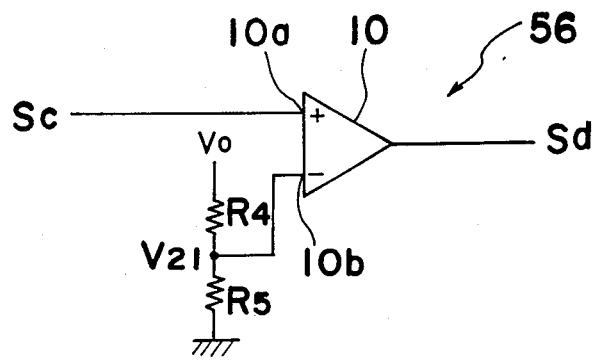
FIG. 11 is a circuit diagram of a signal detector.

Referring to FIG. 11, an example of signal detector 56 is shown, which comprises comparator 10 having a non-inverting input 10a and an inverting input 10b. The non-inverting input 10a is connected so as to receive the signal Sc produced from equalizer 54, such as shown in FIG. 10, and the inverting input 10b is connected so as to receive a constant voltage V21 from a constant voltage generator comprising resistors R4 and R5 connected between a voltage source of Vo and the ground.

Figure 12:
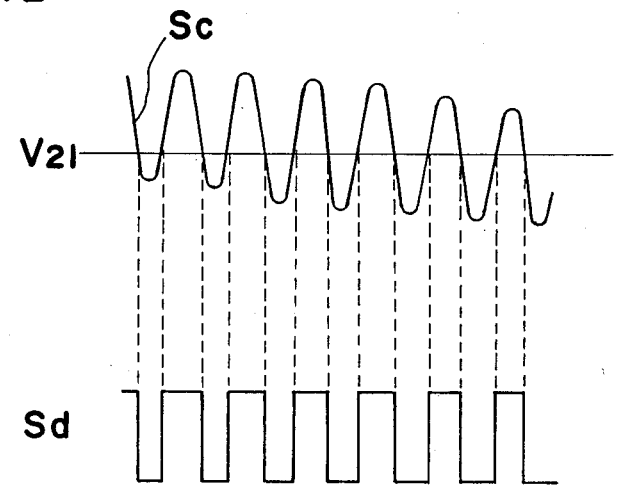
FIG. 12 is a graph showing waveforms obtained at the input and output of the circuit of FIG. 11.

The signal Sc includes the head portion and the data portion defined by a high frequency sinusoidal wave, as shown in FIG. 12. Comparator 10 compares the sinusoidal wave Sc with a constant voltage V21 and produces a rectangular wave signal Sd of binary form carrying information. When the constant voltage V21 aligns with the center line of the signal Sc, the rectangular wave signal will be produced with a constant duty ratio such that the duration of one HIGH level period and the duration of one LOW level period will not change. However, if the center line of the signal Sc deflects from the constant voltage V21, as shown in FIG. 12, the rectangular wave signal will have different durations of one HIGH level period or one LOW level period, resulting in error information.

Although the signal detector 56 of FIG. 11 is applicable in the cases when the signal Sc is stable, it can not be used when the signal Sc fluctuates.

Figure 13:
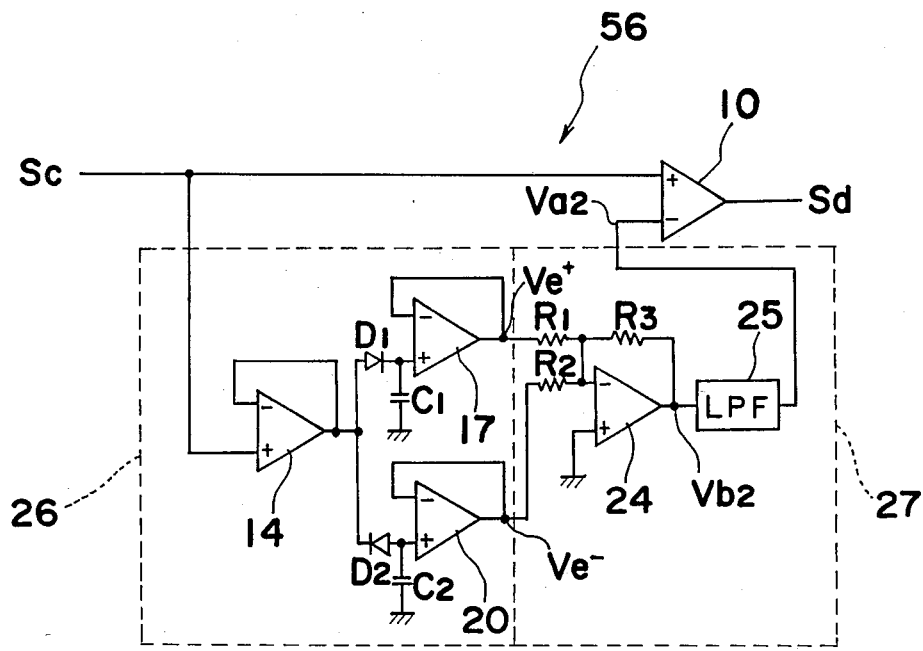
FIG. 13 is a circuit diagram of an improved signal detector.

Referring to FIG. 13, an improved signal detector 56 is shown which comprises an envelope detector 26 and a center line detector 27.

Envelope detector 26 comprises a buffer amplifier 14, diodes D1 and D2, capacitors C1 and C2 and buffer amplifiers 17 and 20. Buffer amplifier 14 receives signal Sc and provides the output thereof to buffer amplifier 17 during the positive half cycle and to buffer amplifier 20 during the negative half cycle. Buffer amplifier 17 detects and holds the positive peak value Ve+ and buffer amplifier 20 detects and holds the negative peak value Ve−. Thus, peak values Ve+ and Ve− define an envelope of the signal Sc.

Center line detector 27 comprises resistors R1, R2 and R3 all having the same resistance, an operational amplifier 24, and a low pass filter 25. Operational amplifier 24 produces a voltage signal Vb2 which is an average between Ve+ and Ve−. Thus, signal Vb2 can be given as follows.

$$Vb2 = (Ve+ + Ve-)/2$$

The voltage signal Vb2 is applied to low pass filter 25 so as to make the voltage signal smooth. Thus, the signal Va2 produced from low pass filter 25 closely coincides with the center line of the input signal Sc.

Figure 14:
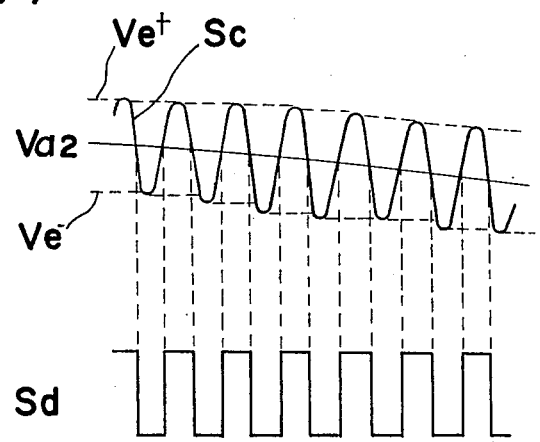
FIG. 14 is a graph showing waveforms obtained at input and output of the circuit of FIG. 13.

In comparator 10, the input signal Sc is compared with the signal Va2 which closely coincides with the center line of the input signal Sc. Thus, the signal Sd produced from the comparator 10 shown in Fikg. 13 will have a constant duty ratio such that the duration of one HIGH level period and the duration of one LOW level period will not change even when the input signal Sc fluctuates, as shown in FIG. 14.

Thus, when signal detector 56 such as shown in FIG. 13 is employed, the data stored in the head portion, as well as in the data portion can be detected with less error, so that the control pulses S1 and S2 as produced relative to the detection of the head portion can be generated with a high reliability and high accuracy.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A waveform processing circuit comprising:
   switching means for receiving an information signal having a first identifying portion and a second information portion as high frequency components on a low frequency carrier, said switching means including first and second input terminals and an output terminal, said signal being received at said first input terminal, and means for selectively connecting said output terminal to said first or said second input terminal;
   sample-hold means, having an input receiving said information signal and an output connected to said second input terminal, for producing a signal consisting of said low frequency carrier; and
   control means, responsive to said second information portion, for providing a first control pulse to said selectively connecting means to cause said output terminal to be connected to said second input terminal during said second information portion of said information signal, and for providing a second control pulse to said sample-hold means, said second control pulse being of greater duration than said second information portion to thereby cause said sample-hold means to sample and hold said low frequency carrier during the presence of said second information portion;
   said switching means thereby outputting only said first identifying portion of said information signal.

2. A waveform processing circuit as claimed in claim 1, wherein said first identifying portion is a low level signal having an amplitude less than a predetermined level, and said second information portion is a high level signal having an amplitude greater than said predetermined level, said first identifying portion and said second information portion each containing a high frequency data component carried on a low-frequency carrier.

3. A waveform processing circuit as claimed in claim 1, further comprising a high pass filter connected to said output terminal of said switching means for eliminating said low frequency component.

4. A waveform processing circuit as claimed in claim 2, wherein said control means further comprises a signal detector for detecting binary data contained in said high frequency component.

5. A waveform proecssing circuit as claimed in claim 4, wherein said signal detector comprises:
   reference voltage producing means for producing a reference signal; and
   a comparator for comparing said high frequency component with said reference signal to produce a first binary signal when said high frequency component exceeds said reference signal and to produce a second binary signal when said high frequency component falls below said reference signal.

6. A waveform processing circuit as claimed in claim 5, wherein said reference voltage producing means comprises voltage dividing resistor means for producing a predetermined constant voltage as said reference signal.

7. A waveform processing circuit as claimed in claim 5, wherein said reference voltage producing means comprises envelope detector means for detecting an envelope of said high frequency component, and a center line detecting means for detecting a center line of said envelope and producing a center line level signal as said reference signal.

8. A waveform processing circuit comprising:

a differential amplifier having a first input terminal, a second input terminal and an output terminal, said first input terminal receiving an information signal having a first identifying portion and a second information portion as high frequency components on a low frequency carrier;

sample-hold means having an input receiving said information signal, and an output connected to said second input terminal of said differential amplifier;

switching means having a first input terminal connected to said output terminal of said differential amplifier, a second input terminal connected to ground, an output terminal, and means for selectively connecting said output terminal to either of said first and said second input terminal; and control means for providing a first control signal to said sample-hold means to sample and hold said low frequency carrier during the presence of said second information portion for a period which is greater than the duration of the presence of said second information portion, and for providing a second control signal, responsive to said second information portion, to said selectively connecting means to cause said output terminal of said switching means to be connected to said second input terminal of said switching means during said second information portion of said information signal;

said switching means thereby outputting a ground level signal during said second information portion of said information signal and outputting a difference signal equal to the difference between said sampled low frequency carrier and said information signal during a period other than said second information portion of said information signal.

9. A waveform processing circuit as claimed in claim 8, wherein said first identifying portion has an amplitude less than a predetermined level, and said second information portion has an amplitude greater than said predetermined level.

10. A waveform processing circuit as claimed in claim 8, further comprising a high pass filter connected to said output terminal of said switching means for eliminating said low frequency component.

11. A waveform processing circuit as claimed in claim 8, wherein said control means comprises a signal detector for detecting binary data contained in said high frequency component of said information signal.

12. A waveform processing circuit as claimed in claim 11, wherein said signal detector comprises:

reference voltage producing means for producing a reference signal; and comparator means for comparing said high frequency component with said reference signal to produce a first binary signal when said high frequency component exceeds said reference signal and to produce a second binary signal when said high frequency component falls below said reference signal.

13. A waveform processing circuit as claimed in claim 12, wherein said reference voltage producing means comprises voltage dividing resistor means for producing a predetermined constant voltage as said reference signal.

14. A waveform processing circuit as claimed in claim 12, wherein said reference voltage producing means comprises envelope detector means for detecting an envelope of said high frequency component, and center line detecting means for detecting a center line of said envelope and producing a center line level signal as said reference signal.

* * * * *